March 17, 1942. P. ZALKIND 2,276,363
CONTAINER, MATERIAL AND PARTS THEREFOR
Filed March 16, 1938 7 Sheets-Sheet 1

Fig. 10-A

INVENTOR.
Philip Zalkind
BY Ostrolenk, Greene & Marsen
ATTORNEY.

March 17, 1942. P. ZALKIND 2,276,363
CONTAINER, MATERIAL AND PARTS THEREFOR
Filed March 16, 1938 7 Sheets-Sheet 2
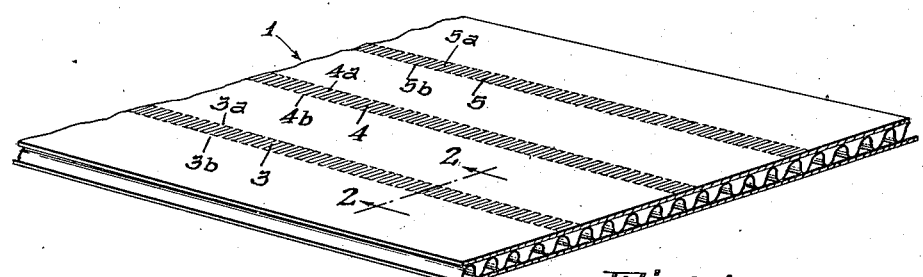
Fig. 1-A
Fig. 3
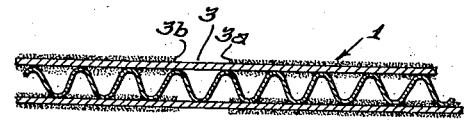
Fig. 2
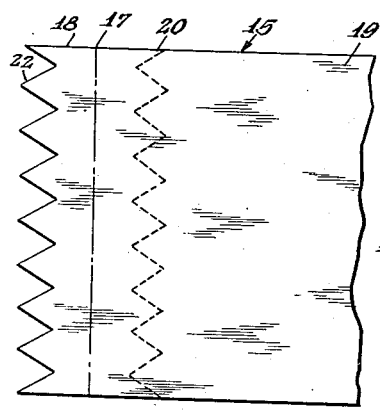
Fig. 12
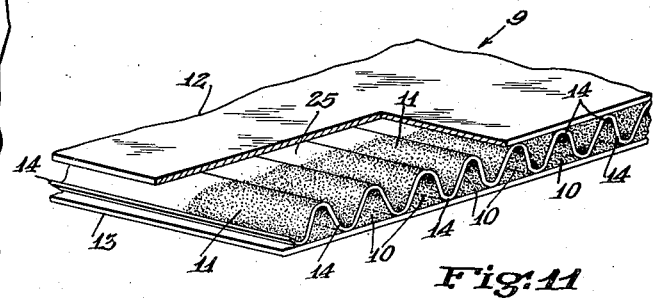
Fig. 11
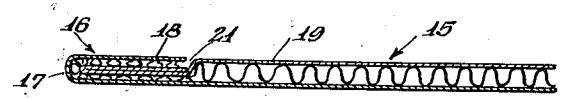
Fig. 13
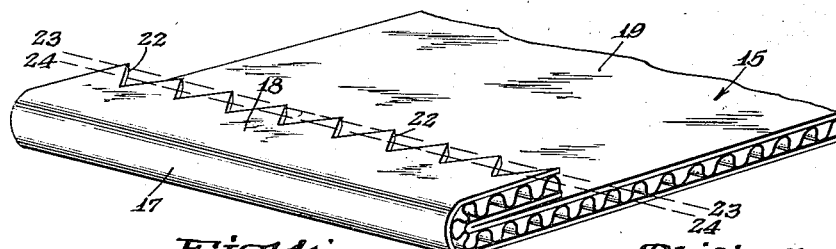
Fig. 14
INVENTOR.
Philip Zalkind
BY Ostrolenk, Greene & Marsen
ATTORN'

March 17, 1942.    P. ZALKIND    2,276,363
CONTAINER, MATERIAL AND PARTS THEREFOR
Filed March 16, 1938    7 Sheets-Sheet 3

INVENTOR.
Philip Zalkind
BY Ostrolenk, Faber & Mansen
ATTORNEY.

March 17, 1942. P. ZALKIND 2,276,363
CONTAINER, MATERIAL AND PARTS THEREFOR
Filed March 16, 1938 7 Sheets-Sheet 4

INVENTOR.
Philip Zalkind
BY Ostrolenk, Greene & Mansen
ATTORNEY.

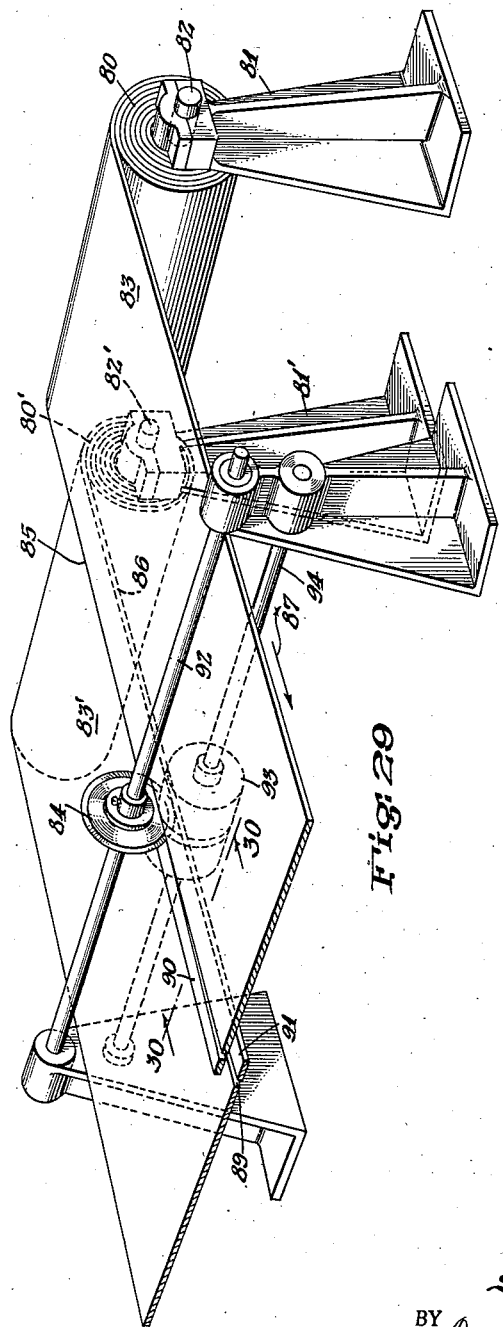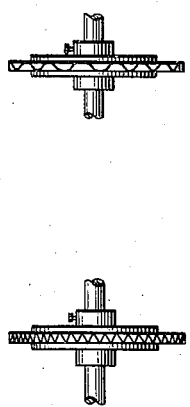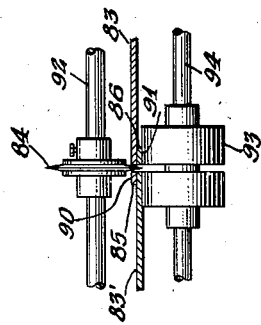

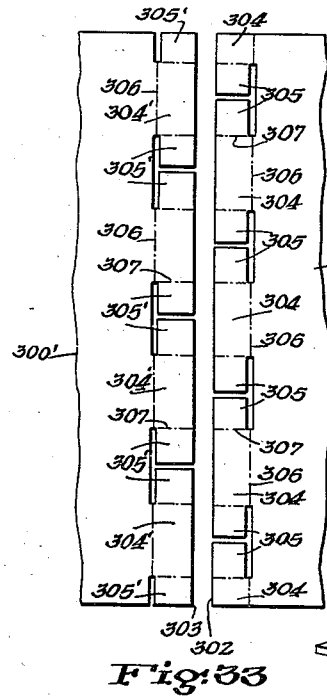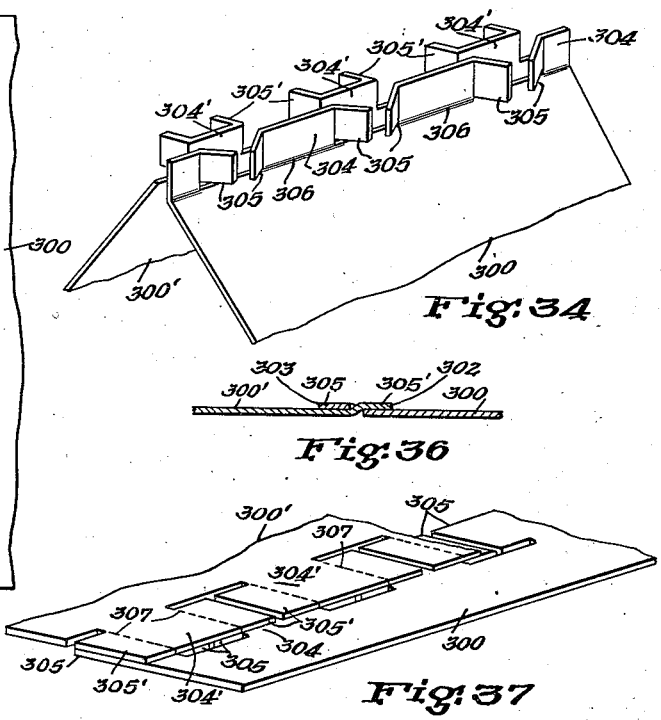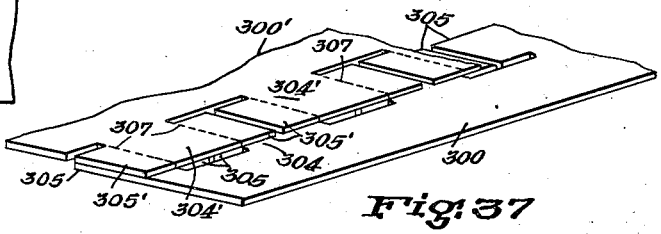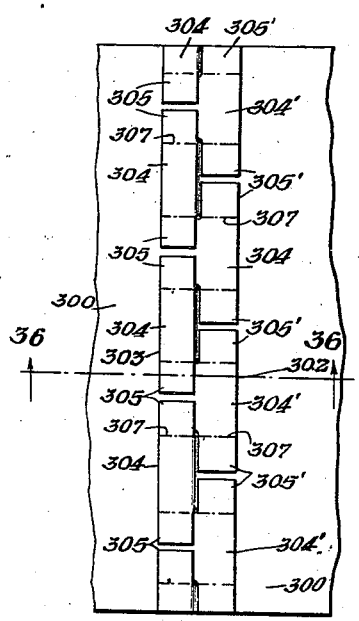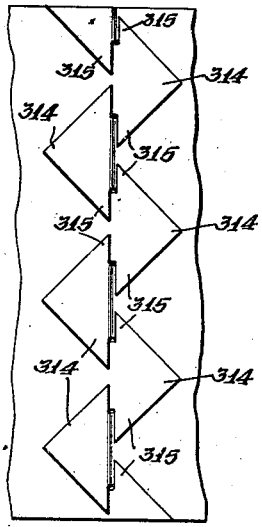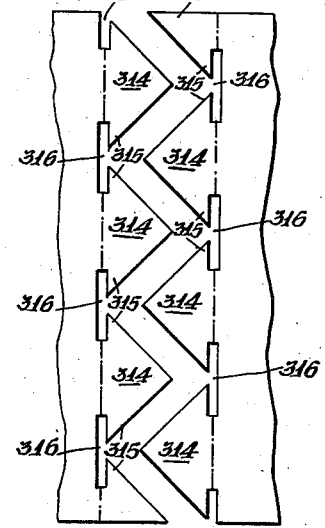

March 17, 1942. P. ZALKIND 2,276,363
CONTAINER, MATERIAL AND PARTS THEREFOR
Filed March 16, 1938 7 Sheets-Sheet 7

INVENTOR.
Philip Zalkind
BY Ostrolenk, Faber & Marsen
ATTORNEY.

Patented Mar. 17, 1942

2,276,363

UNITED STATES PATENT OFFICE 2,276,363

CONTAINER, MATERIAL AND PARTS THEREFOR

Philip Zalkind, New York, N. Y.

Application March 16, 1938, Serial No. 196,139

4 Claims. (Cl. 154—52)

My invention relates to containers and parts thereof constructed from fibrous sheet materials and improvements therein, and more specifically relates to corrugated board, paper board, cardboard, felt cloth, paper material and other types of fibrous sheet material, methods of producing them and their use in connection with collapsible containers.

Containers and materials of the type contemplated herein may take many forms and may be used for many purposes; they may consist of folding boxes or cartons, packing or shipping containers, collapsible and rigid casings and containers including transfer file cases, storage boxes, portable ward-robes, cabinets and similar structures, insulated containers, insulation sheets and other forms which are well known in the paper and container art.

Where a container or casing is to be formed in such a manner that an integral sheet will form two or more sides thereof, or where the walls of such a container are to be rotated with respect to each other about any specific fold or bend line, it is at present necessary to score, crease or otherwise weaken the sheet material of which the container is made in order to form the predetermined bend line or to otherwise predetermine a bend line by means not associated with the sheet material itself. Such bend lines are particularly required in collapsible or folding containers such as the transfer file casing described in my applications Serial No. 690,360 filed Sept. 2, 1933, Serial No. 692,937 filed October 10, 1933, Serial No. 45,715 filed October 19, 1935, my application Serial No. 21,411, filed May 14, 1935 and application Ser. No. 693,841, filed October 16, 1933, now patent No. 2,233,906 and my Patents No. 1,946,516 issued Feb. 13, 1934, No. 2,088,315 issued July 27, 1937. Such scored or otherwise weakened bend line may obviously constitute a weakness in the completed structure.

Accordingly, objects of my invention are to provide in a container a predetermined fold or bend line defining walls, not dependent on scoring. And another object is to provide a predetermined flex line or bend line or a number of such lines in a sheet of fibrous material, retaining all the initial strength of the sheet, and not being formed by scoring, creasing, cutting or any other weakening operation.

In the formation of such containers and casings, it is often found desirable or necessary to strengthen or reinforce the sheet material where maximum stresses or specific loads occur. It would in many cases be desirable to strengthen the texture of the sheet of fibrous material itself or specific portions thereof. Such strengthening of the texture of the entire sheet would serve to enable the sheet material to better cooperate with any reinforcing elements which may be used or may even permit dispensing with other added reinforcing elements. Where added strength is required as at the wall edges of a container, it may be desirable to strengthen only that portion of the sheet. In all cases, however, it will be advantageous to have a sheet which is stronger and more rigid than an ordinary fibre sheet of the same character.

Other objects of my invention, therefore, are to provide for a container, casing or other purpose, a fibrous sheet material, such as corrugated board, cardboard, paper, paper-box board and the like, which shall be rigidified and strengthened by means integrally associated with such fibrous sheet, either throughout its entire area or along specific lines or areas.

In the formation of such containers, it may be desirable to have not merely a flex or bend line unweakened or unscored as above described, but also to have a flex line which is reinforced and strengthened along the line of flex.

Further objects of my invention therefore are to provide for a container or casing or for other suitable uses, a sheet of fibrous material having a flex or bend line which has not only all of the original strength of the sheet, but which, when the sheet is bent along said line, will have a reinforced condition along such area, without requiring any additional elements or reinforcing members to produce such reinforced condition.

Where in a container or casing constructed from fibrous sheet material, such material is strengthened at a specific area only, any stresses upon the strengthened area may be communicated along the entire sheet and cause it to bend or fold along the boundary between the strengthened and unstrengthened portions of the sheet.

Therefore, further objects of my invention, are to so arrange the line of division between the strengthened and unstrengthened portions of the fibrous sheet of the container as to prevent accidental unintended bending or folding of the sheet at such meeting line.

In forming a container from an integral sheet of fibrous material, the sheet must be bent or folded and the edges joined together. Such a line along which the edges of the sheet are joined, often presents a weakened line along which the container or structure may sag or buckle.

Additional objects of my invention therefore are to provide for such container an edge formation for the sheet material thereof which will permit the uniting of edges of such sheet along a line which will be as strong and rigid as the abutting material. Such formation may, of course, be used for joining the edges of two separate sheets or to permit the insertion of an additional sheet between the edges of other sheets, as for instance in a casing where it is intended to insert a bottom wall or area of different material or special form.

For many of the uses above described, it may be desirable to have a sheet in laminar form, such sheet nevertheless presenting any or all of the novel advantages previously set forth. However, original materials may be so dimensioned in their manufacture as to require that sheets be laid side by side to form a single layer of the desired width. Heretofore, it has been found exceedingly difficult if not impossible to exactly match the abutting edges of such laterally adjacent sheets of a single layer.

A further object of my invention, therefore, is to present a method for exactly matching abutting edges of laterally adjacent separate fibrous sheets.

Other objects and uses of my invention will be apparent from the following description and drawings in which:

Figure 1A is a blank of corrugated sheet material.

Figure 2 is a partial cross-section of the sheet of corrugated board of Figure 1A on the line 2—2 looking in the direction of the arrows, after impregnation by my special method.

Figure 3 is a cross-section of a laminar sheet with a plurality of layers of rigidifying material and a sheet of fibrous material as a binder.

Figure 10A is a view in cross-section of a laminar sheet formed from the sheets of Figure 9 and bent upon the bend lines.

Figure 11 is a fragmentary perspective of a corrugated sheet with a rigidified edge.

Figure 12 is a plan view of a sheet from which the reinforced edge of Figure 13 is formed.

Figure 13 is a cross-section view of a sheet of corrugated board with a reinforced edge.

Figure 14 is a perspective of the sheet of Figure 12 showing the sheet folded to form the reinforced edge sheet of Figure 13.

Figure 29 is a view in perspective of a means and method for matching abutting edges of laterally adjacent sheets.

Figure 30 is a cross section on the line 30—30 of Figure 29 making in the direction of the arrows.

Figures 31 and 32 are edge views of modified forms of cutting knives for the means of Figure 29.

Figure 33 illustrates in plan view a modified form of edge formation for the purpose of uniting edges of plane sheets.

Figure 34 is a perspective view of the sheets of Figure 33 illustrating the manner in which the edges of the sheets may be brought for the purpose of uniting such edges.

Figure 35 is a plan view of the sheets of Figure 33 after such sheets have been united along their edges.

Figure 36 is a view in cross-section of the sheets of Figure 35 looking in the direction of the arrows.

Figure 37 is a perspective view showing an alternative method by which the sheets of Figure 33 may be laid together for the purpose of uniting them at their edges.

Figure 38 is a cross sectional view which corresponds to Figure 36 and illustrates the formation of the uniting sheets of Figure 37.

Figures 39 is a plan view illustrating a modified form of the edge formation of Figure 33.

Figure 40 is a plan view of the sheets of Figure 39 after such sheets have been united along their edges.

Figure 1:
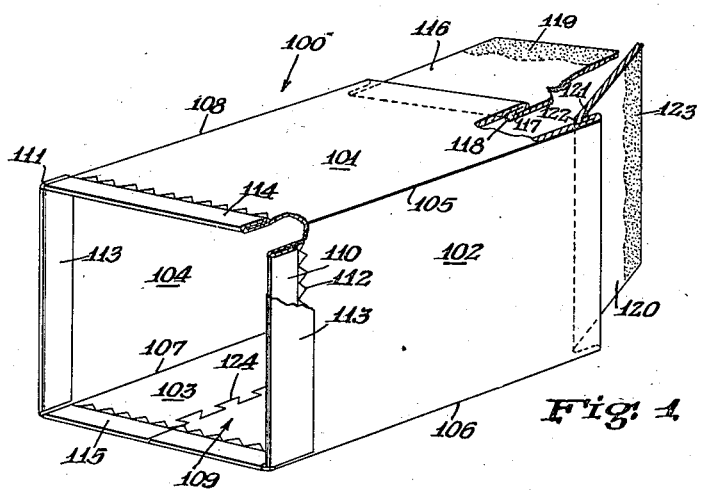
Figure 1 is a novel casing formed in accordance with my invention.

Referring now to Figure 1, I have illustrated a tubular quadrilateral collapsible container 100 made of fibrous material and comprising rigid walls 101, 102, 103, 104 united to each other along flexible bend or flex lines 105, 106, 107, 108. The said flex or bend lines being formed without necessarily cutting, scoring, creasing or otherwise weakening the sheet 101—104. The said container has an open front end 109 with vertical reinforcements 110, 111 integrally formed from the material of the side walls 102 and 104 respectively, each of the said reinforcements having a serrated, broken, non-linear boundary or edge 112 between it and its wall so that torsional forces along the reinforcements 110 and 111 will not be concentrated along a single straight line to produce a bend at an undesired line. Each of the said reinforcements 110 and 111 may have a facing or covering strip 113. Horizontal front edge reinforcements 114 and 115 constituting integral portions of the horizontal walls 101 and 103 respectively are formed by further rigidifying or strengthening the sheet along said edges in a manner hereinafter described. The said container also has back closure flaps. The upper horizontal flap 116 is formed by folding in a portion 117 of the top wall 101 and adhesively securing such portion to the top wall; as shown in my Patent No. 1,559,834 issued November, 1925. By reason of the difference in the thickness of the material 117—101 and the remainder of the flap 116, a bend line 118 is produced permitting the folding down of the flap along such line. The edge 119 of the flap 116 is left unrigidified and weaker than the remainder of the flap so that it may meet and match with the edge of the similar flap extending from the bottom wall 103; a similar flap being provided at the bottom wall 103. Similarly, a vertical flap 120 is formed by folding in a portion 121 of the side wall 102 which portion may be adhesively secured to the said wall. A bend line 122 is produced in the manner previously described the flap 120 rotating upon it. The entire flap 120 may be as rigid as the remainder of the sheet 102 or it may be left unrigidified and have a rigidified or reinforced edge 123 only. The reinforced portion 121—102 may be further rigidified to create a vertical rear-end reinforcement and may be compressed to the original thickness of the wall 102 to permit collapsibility of the casing. In setting up the casing, I prefer to fold up the horizontal flap 116 and its corresponding bottom flap first, the unrigidified edges 119 permitting them to meet and lie edge to edge to effect a closure; then to fold in the vertical flaps 120 so that they rest between turned in portions 117 of the horizontal flaps and against said horizontal flaps thus providing a vertical reinforcement at the rear of the casing between the horizontal walls as well as serving to hold the casing in rigid angular relation.

The vertical front reinforcements 110 and 111 will serve as load carrying members to support the load of superposed casings if any, the vertical reinforcements of such superposed casings being linearly adjacent and resting each upon a similar reinforcement below thus transmitting any vertical load to pass from reinforcement to reinforcement through the stack of casings. Various means may be used, if necessary, to maintain rigid angular relation at the front edge of the casing.

The edges of the integral sheet forming the casing may be joined together along a serrated, broken, non-linear line 124 which will serve to prevent sagging or buckling along said line.

Each of the constructions which thus unite to produce my novel casing is hereinafter specifically described.

In Figure 1A, I have illustrated an ordinary blank of corrugated sheet material 1, from which my casing may be formed, having a series of flexible bend lines, 3, 4 and 5 respectively bounded by the lines 3a, 3b; 4a, 4b and 5a, 5b.

Referring now specifically to the flexible bend line 3 contained within the boundaries 3a and 3b it is intended that the material contiguous thereto and forming the remainder of the blank 1 be relatively rigid but that the material 3 between the parallel dotted lines 3a and 3b may remain unscored, uncrushed, undeformed, and yet retain the initial flexibility of the sheet thus forming a bend line.

It will be understood that any reference herein to the material 3 within the parallel lines 3a and 3b will apply also to the material 4 between the parallel lines 4a and 4b and the material 5 within the parallel lines 5a and 5b. Also, any reference to any process or action or operation relating to the material 3 will also apply to the portions of the material designated by the characters 4 and 5.

To attain this result, a blocking out material such as linseed oil may be striped on that portion 3 of the blank 1 between the parallel lines 3a and 3b. Impregnation by the oil on the lines indicated result. Thereafter, when the sheet 1 is dipped into a rigidifying substance such as a solution of silicate of soda, all of sheet 1 by reason of its fibrous nature will be pregnated with the silicate of soda; except for portions 3, 4 and 5 of blank 1 which are not thus impregnated by reason of the prior oil impregnation which effectively stops or blocks out the entry of the sodium silicate at the oil lines.

After the sheet has dried, it will have become rigid and inflexible except along the oil striped lines.

It is thus obvious that the sheet 1 may be folded about its flexible portions 3, 4 and 5 to form a tube. Further, the impregnation with silicate of soda, as is well known, produces a fire resistant condition.

It will also be obvious that mechanical means of blocking out the portions 3, 4 and 5 of the sheet 1 may be used.

In another chemical means of blocking out the flexible bend lines, the portions of the sheet 3, 4 and 5 may be impregnated with a casein solution containing glycerine and other materials as is well known in the art, or with a latex solution; and in a like manner, the sheet may be dipped in silicate of soda and thus produce a rigid sheet with a flexible bend line as previously described.

In a further embodiment of my invention, the portions of the sheet indicated by the characters 3, 4 and 5 may first be impregnated with, for instance, a casein or latex solution or with linseed oil and then the sheet may be coated with silicate of soda. In such a method, approximately the same effect will be produced as if the sheet had been dipped; but the entire sheet, being then coated with silicate of soda will be fire-resistant and the portions impregnated with the casein solution or the latex, by reason of the elastic nature of the materials in such solution, will be flexible.

In another form of my invention, the portions 3, 4 and 5 of the sheet 1 which are intended to form the flexible bend lines may first be impregnated with ammonium phosphate or an acid solution which will neutralize and dissolve the silicate of soda so that here again the flexible fold lines will be produced in a rigid sheet.

It should be noted that the mention of limitations to specific impregnating materials are intended by way of illustration only and are not to limit the application of my invention. Thus, any other plasticizing solution which has an action similar to that of latex may be used or an oil whose action is similar to that of linseed oil, or any solution similar in effect to a casein solution, or any acid solution which will neutralize or precipitate silicate of soda may be used.

Of course, to make even the flexible bend lines fire-resistant, such a solution should be used to form the flexible bend lines as will be fire-resistant, ammonium phosphate with borax for instance, or such a solution as will form a fire-resistant precipitate in its reaction with silicate of soda may be used.

Further, it is not intended to limit the application of my invention to mere use of silicate of soda only, but any solution which can be blocked out or made neutral by another solution and which will also make the fiber sheet rigid may be used. Also, any type of fibrous sheet material such as paper board, cardboard, felt, cloth paper material and other fibrous material may be thus treated. I have also found that coating a sheet of fiber material with a solution of silicate of soda and asbestos and blocking out specific areas such as are indicated by 3, 4 and 5 of Figure 1 will produce a sheet which is rigid, fire-resistant and, nevertheless has flexible fold lines which have not been created by crushing, scoring or other deformations weakening the sheet. Thus, a solution of ground asbestos and water may be applied on sheet 1, being blocked out however by any suitable means from the areas 3, 4 and 5 intended to form the flexible fold lines; and the said solution having been thus applied may be painted over with a solution of silicate of soda which will bind the porous coat of ground asbestos to the fibrous material of the sheet 1 and thus produce a rigid fire-resistant sheet with flexible fold lines.

Also, a mixture containing silicate of soda in solution and asbestos in suspension may be used and may be applied in the same manner, as will now be clear to those skilled in the art.

I have found that, although a simple coating with silicate of soda, when applied to a sheet of material, may when drying, craze and crack; nevertheless, the mixture of asbestos into such solution before the application thereof, will, in addition to the better fire-resistant effect thus created, prevent such crazing and cracking.

In a similar manner a mixture of a solution of silicate of soda and ground asbestos or a mixture of silicate of soda and asbestos fibers or any mixture of a rigidifying adhesive and a fibrous material may be used.

In my invention, by the addition of successive coatings of the mixtures previously described upon the sheet, successive layers of the rigidifying material may be built up upon such a sheet in such a manner that such material may even predominate in the sheet, so that the sheet material will merely form a base or binding for such material laid down in laminar form, to create a rigid, fire-resistant substantially non-fibrous sheet, which will nevertheless comprise a bend line.

I have illustrated this manner of construction of a laminar non-fibrous rigid fire-resistant sheet in Figure 3 where the successive coatings 8 have been laid down on the fibrous sheet 7, such coatings being omitted along the line 8a to produce a bend line. Of course, both sides of the sheet 7 may thus be coated.

Other means for forming a predetermined bend line in a fibrous sheet by retaining the original flexibility of the sheet along said bend line will now be clear.

Figure 4:
Figure 4 is a view in cross-section of a plurality of fibrous sheets to be combined into a laminar sheet having bend lines.
Figure 5:
Figure 5 is a view in cross-section of a laminar sheet having bend lines; formed from the sheets of Figure 4.
Figure 6:
Figure 6 is a view in cross-section of a plurality of fibrous sheets to be combined into a laminar sheet having bend lines.
Figure 7:
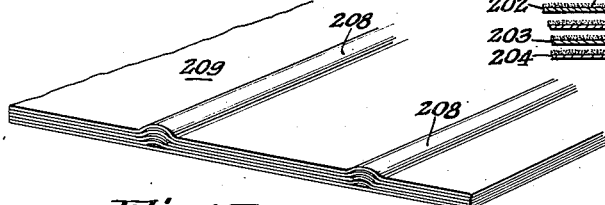
Figure 7 is a view in perspective of a laminar sheet formed from the sheets of Figure 6.
Figure 8:
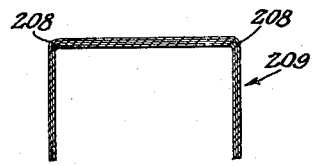
Figure 8 is a view in cross-section of the laminar sheet of Figure 7 when bent upon the bend lines.

Thus, in Figure 4, I have shown in cross-section a plurality of fibrous sheets 201, 202, 203, 204 having an adhesive binder 205 such as sodium silicate between them, said adhesive binder being omitted along the lines 206 intended to form the bend lines. When the sheets are compressed to form the laminar sheet 207 (Fig. 5), the adhesive binder and rigidifier 205 being omitted along the lines 206, the sheets will have their initial flexibility along said lines and such lines will then be predetermined bend lines.

Where a large number of laminations are to be used, greater strain will be placed on the outer sheets than on the innermost sheet when the sheet is bent. The possibility of such excess strain may be avoided by laminating the sheets together in the manner shown in Figures 6, 7 and 8. In Figure 6, the sheets 201, 202, 203, 204 have an adhesive binder 205 between them, such binder being omitted along the lines 208, 208. The sheet 204 which is to be on the interior of the bend to be formed is flat. The next sheet 203 is slightly raised along the bend line 208, the raised portion forming an arcuate section, successive superposed laminations are raised still more at the bend line 208 having even a greater arcuate section thereat. The adhesive binder is omitted along the arcuate section of each sheet. When the laminations are compressed together, a sheet 209 (Fig. 7) having bend lines 208 wherein the side of the laminar sheet which is to form the outside of the bend is raised and apparently embossed along said bend lines. When the sheet 209 is bent (Fig. 8) along the bend lines 208, the outer portion of the sheet may then accommodate itself to the bend without undue strain, the portion of the laminar sheet along the bend line having the initial flexibility of the original sheets comprising the laminar sheet.

Figure 9:
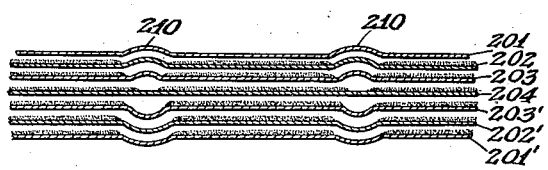
Figure 9 is a view in cross-section of a plurality of fibrous sheets to be combined into a laminar sheet having a modified form of bend lines.
Figure 10:
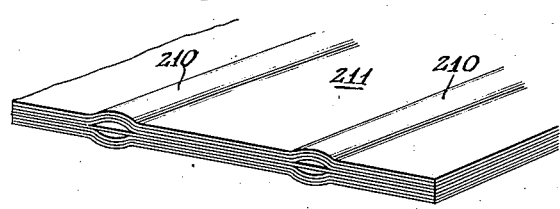
Figure 10 is a perspective view of the laminar sheet formed from the sheets of Figure 9.

Such a formation can be used to create even a reinforced yet flexible bend line by following the method shown in Figure 9, wherein sheets 204, 203, 202 and 201 are combined in the same manner as described in Figure 6. But additional laminations 203', 202', 201' are added in the same manner on the opposite side of sheet 204. When the sheets are compressed a bend line 210 is produced in sheet 211 (Fig. 10). The sheet may be bent in either direction, but the fulcrum about which it bends is in lamination 204. The arcuate sections of the laminations on the outside of the bend are extended by the bend and follow it. But the arcuate sections of the laminations on the inside of the bend are extruded by the bend and form the post 212 (Fig. 10A).

It should be noted that, with a bend line of this type, the sheet may be bent in either direction and a post 212 will be produced on the inside of the bend. With the bend line of Figures 6 and 7, the direction in which the sheet may be bent without undue strain is predetermined, the sheet being properly bendable only toward the face of the sheet which does not have the raised arcuate sections.

In all cases, however, it should be noted that a flex or bend line is produced in the sheet by permitting the sheet to remain in its original state along such bend line. The use of a score should not be regarded as completely excluded by the flexing means herein described. In cases where the sheet has little or no flexibility in its original state or where the sheet is of such thickness that a bend may tear one or both of its surfaces, a score may be provided along such bend line solely for the purpose of overcoming such difficulty.

While my invention is peculiarly adapted to use in connection with any collapsible structure which must necessarily have flexible fold lines, it is obvious that structures intended to be rigid and manufactured as such may also be constructed with the materials hereinbefore described.

It may be desirable or necessary at any particular time, however, to rigidify only the edge of a sheet of corrugated or other fibre board or to produce a reinforcement or reinforcing condition in only a certain portion of the sheet.

Such a reinforced edge may have many other uses in addition to reinforcing edge portions of the container. Thus, it may be used for the edges of a follow block as described in my application Serial No. 61,859, filed Feb. 1, 1936. The uses of a reinforced portion in the body of the sheet may further be adapted for such specific surfaces as may be subjected to unusual stresses or extraordinary wear.

Also instead of weakening an ordinary sheet to form a predetermined bend line, the body of the sheet adjacent to the desired bend line may be reinforced so as to make it possible to produce an additional torsional stress adjacent to the edge of such reinforcement when the sheet is subjected to a bending movement, thus causing the sheet to bend adjacent to the edge of such reinforced portion. Many other uses of such a specific reinforced portion of a sheet will be obvious, and it is not intended to limit the specific application of my invention to the specific illustration herein set forth.

In Figure 11 I have illustrated a sheet of corrugated board 9 in which the flutes 10, 10 along an edge thereof have been treated with a rigidifying solution 11, such as silicate of soda. Such a sheet may be dipped into a solution of silicate of soda so that the flutes 10 will be filled to a required depth, or the upper and lower surfaces 12 and 13 may be coated on their inner side with such a solution before they are applied to the corrugations 14; or the rigidifying solution or filler may be injected into the flutes in any suitable manner. When the flutes are filled by dipping, the rigidifying solution may if desired be omitted from the outer portions of the surfaces 12 and 13 by any suitable mechanical or chemical method as hereinbefore described.

In any of the illustrations herein given it should be understood that the reference to silicate of soda is by way of illustration only, and that any rigidifying solution or filler may be used.

The edge of the sheet may of course be impregnated by dipping in which case the outer surfaces of the corrugated sheet will also be coated with the rigidifying solution. Any of the methods previously described for impregnating and rigidifying the entire sheet will of course apply in this case.

In all cases it should be noted that the reference to and use of corrugated board is illustrative only. Any type of porous or fibre sheet may be treated and used as herein described.

In Figure 13 I have shown a sheet of corrugated board 15 with an edge reinforcement 16. The sheet 15 (Figure 14) is bent back at the line 17 so as to form an additional layer of corrugated board 18. An adhesive substance is then applied between layers 18 and 16 and they are subjected to pressure so as to reduce their combined thickness to that of the main sheet 15 producing the reinforced edge 16 (Figure 13).

In such a case the use of adhesives may however be superfluous and unnecessary. Merely moistening the areas intended to be subjected to pressure will cause the various layers to adhere to each other and retain their compressed form. Applying heat at the time of pressure will facilitate the process.

Reference to the plan view of Figure 12 will show the relationship of the various portions of the sheet intended to have the reinforced edge. To facilitate compression the surface 19 of the sheet 15 may be slit along the line 20 to receive the edge of the layer 18.

The method herein described produces a reinforced condition by reason of the additional density of material at the area to be reinforced. It is obvious that impregnation or filling of the material of the sheet at the reinforcing area with a rigidifying solution will impart even added strength. In the preferred embodiment of my invention the reinforced area 16 will be impregnated or filled before pressure is applied and the pressure will be then applied before the rigidifying solution has had an opportunity to harden.

Since the sheet itself is thus rigidified at the edge 16, it may occur that because of the differential of stresses at the line 21 (Figure 13) it would be much easier for the sheet to bend on that line so that the sheet may actually be weakened at this one line when the edge is reinforced. It may therefore, in specific instances, become necessary to disperse or diffuse such torsional stresses so that they will not operate along any particular line and so that no additional torsional stress or bending moment may be applied along any one continuous line. I have found that by making the line of the edge of the turned back reinforcing piece discontinuous or zigzagged or scalloped, such torsional stresses are diffused over a considerable portion of the sheet thus minimizing the bending moment of the reinforced edge.

Thus in Figures 12 and 14 I have illustrated how the reinforcing layer 18 of the sheet 15 may be turned back on the line 17 and pressed into the body of the sheet as above described to form the reinforced edge 16. The reinforcing layer 18 has a discontinuous edge 22 of any suitable form in such a manner that no continuous bending moment may be effective. Thus, there is no substantially greater bending moment along the line 23—23 (Figure 14) since such line only intersects mere points of reinforcement and does not coincide with any straight line of reinforcement. Nor is there any substantially greater bending moment at any line upon the reinforcement, as for instance line 24—24, since such a line can also cross only points of reinforcement and cannot coincide with any line of reinforcement.

By the use of such a discontinuous interrupted, dispersed or non-linear boundary, it is possible to reinforce an edge or an area without fear of creating a weakening line or an undesired bend line at the boundary between the reinforced and unreinforced areas. The same principle is applicable to reinforcement of an area by impregnation with a rigidifying solution. A non-linear, discontinuous, zigzagged, scalloped or otherwise deformed boundary line may be created at the edge 25 (Figure 11) of the rigidifying material 11 and may thus be effective for the purpose of preventing the concentration of torsional forces between the reinforced and unreinforced areas at a single straight line.

It will be readily understood that a plurality of layers may be used to obtain such a reinforced edge or area.

Figure 15:
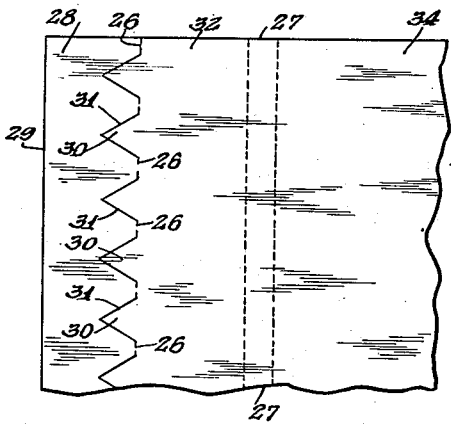
Figure 15 is a plan view of a sheet intended to have an alternative form of edge reinforcement.
Figure 16:
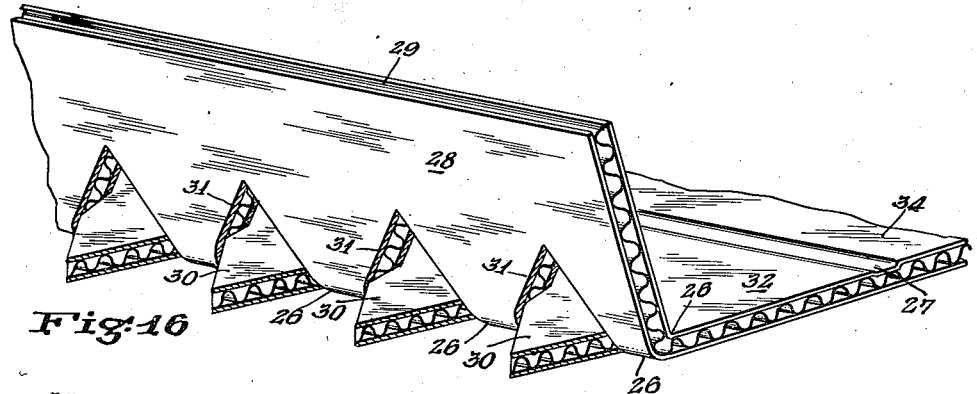
Figure 16 is a partial perspective of the sheet of Figure 15, partially folded up.

In Figure 15, I have shown a sheet of corrugated board scored along the line 26 and double scored at 27. The material in area 28, between the score line 26 and the edge 29 of the sheet has incised therefrom a series of lugs 30, 30 cut along the lines 31—31 and integrally connected to the area 32 which lies between the score line 26 and the double score line 27. The score line 26 is discontinuous along the bases of the lugs 30, 30 so that when the area 28 is bent along line 26 lugs 30, 30 will continue to lie in the same plane as area 32 as illustrated in the perspective view Figure 16 showing the partial folding up of the edge reinforcement to be formed by this construction.

Figure 17:
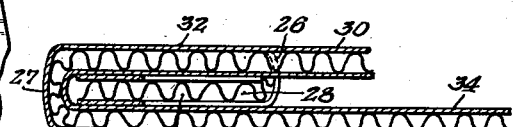
Figure 17 is a cross-section view of the sheet of Figure 15 showing the folding operation completed.
Figure 18:
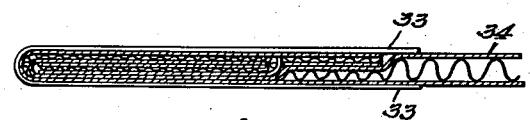
Figure 18 is a cross-section view of a finished reinforced edge sheet formed from the sheet of Figure 15.

When the sheet is fully folded up (Figure 17) and ready to be subjected to pressure, the lugs 30 now project away from the edge of the sheet now formed by the area defined by the double score line 27 so that the edges of such lugs 30 and the score line 26 form a discontinuous non-linear boundary line between the reinforced and unreinforced areas after compression has finished the process (Figure 18). A facing sheet 33 may be used to improve the appearance of the finished edge, and the area to be thus reinforced may first be impregnated by a rigidifying solution. Such a facing sheet may be used to cover any of the reinforced edges herein described; it will also facilitate the piling of finished sheets on each other since it will tend to prevent this adhering together.

The same process may be used for any type of fibrous or impregnable sheet and is of course not limited to corrugated board. Although I prefer that the various layers of the reinforced area be compressed together, that is not essential. Such layers may be partially compressed to merely approach the thickness of the main sheet or they need not be compressed together at all. Thus, the construction shown in Figure 14 will provide reinforcement without further compression; and the structure shown in Figure 17 may be compressed completely as shown in Figure 18 or it may only be compressed to the extent that lugs 30 will lie against the body of the sheet 34.

Figure 19:
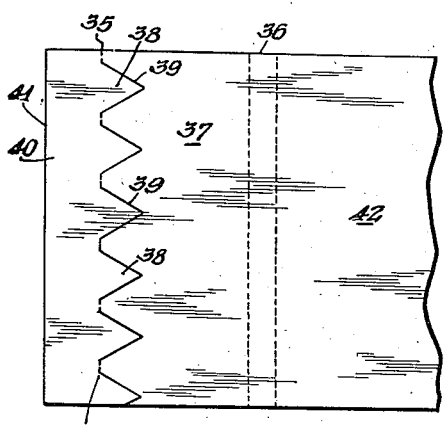
Figure 19 is a plan view of a sheet from which the reinforced sheet of Figure 22 is formed.
Figure 21:
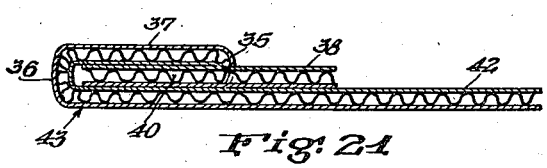
Figure 21 is a cross section view of the sheet of Figure 19 showing the folding operation completed.
Figure 20:
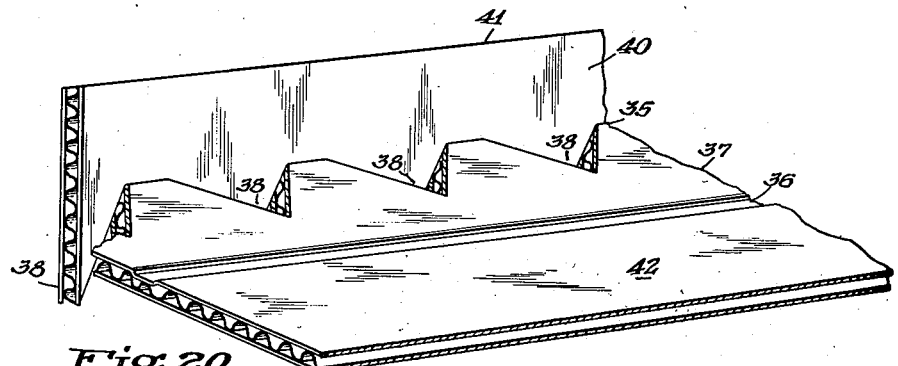
Figure 20 is a partial perspective of the sheet of Figure 19 partially folded up.

The lugs however, may if desired, be so cut as to give a multiple edge reinforcement with a discontinuous non-linear boundary without requiring compression at all. This construction is shown in Figures 19, 20 and 21. The sheet is scored at 35 and double scored at 36. The material 37 between the score line 35 and the double score 36 has excised therefrom a series of lugs 38 cut along the lines 39 but integrally connected to the area 40 lying between the score line 35 and the edge 41. The score line 35 is discontinuous along the bases of the lugs 38 so that when the area 40 is bent along the score line 35, lugs 38 will turn with it and continue to lie in the same plane as area 40 as illustrated in the perspective view of Figure 20 showing the partial folding up of the edge reinforcement to be formed.

When the sheet is fully folded up (Fig. 21) and the edge reinforcement adhesively bound in place, the sheet 42 has a triple edge reinforcement 43, the lugs 38 and the bend line 35 creating a discontinuous non-linear boundary between the reinforced edge 43 and the remainder of the sheet 42, the purpose of which boundary has been heretofore set forth.

Figure 22:
Figure 22 is a cross section view of a reinforced edge sheet formed from the sheet of Figure 19.

In the event that a plane sheet should be desired, the reinforcement shown in Figure 21 may be compressed to produce the reinforced edge 44 of Figure 22.

Figures 23, 24:
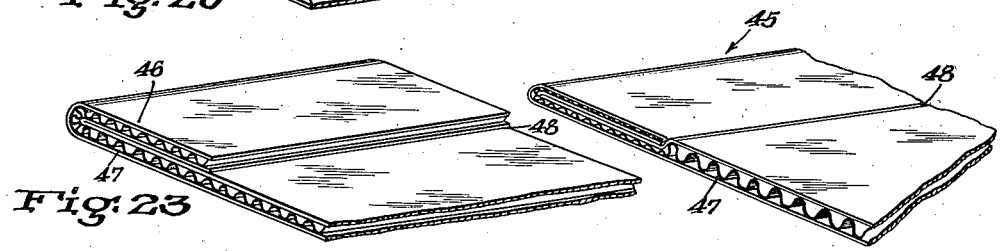
Figure 23 is a perspective view of a corrugated sheet folded up to form a reinforced edge.
Figure 24 is a perspective view of a reinforced edge sheet formed from the sheet of Figure 23.

It is not essential that the portion of the superposed sheet which forms the reinforcement be integral with the body of the main blank. It may be a strip or strips entirely separated from the main blank; but it may nevertheless be superposed upon said blank and treated in such a manner as to produce a reinforced edge.

Where it is specifically desired to create a bend line immediately adjacent the reinforced area, the construction shown in Figures 23 and 24 may be used where the reinforced edge 45 (Figure 24) is formed by the compression of layers 46 and 47 (Figure 23) with a straight boundary 48 between the reinforced area and the remainder of the sheet which line forms an effective predetermined bend line owing to the fact that it is the line along which any torsional force applied to the reinforced area 45 will have the first opportunity to be effective.

This may apply of course to any type of fiber board besides corrugated board, and the manner of forming the reinforced edge by using such a separate strip will be exactly the same as that used in a fold-back on an integral blank. In addition, the principle of the diffusion of torsional stress by means of non-linear discontinuous lines or zigzagged formation of the edges of said reinforcing strip will apply in the case of a separate strip just as in the integral fold-back. It will further be simpler in cases, where it is desired to reinforce the edge by a plurality of layers and still have the discontinuous boundary line herein described, to use the separate strips than to make use of a fold-back. A facing strip may also be used to improve the appearance of the finished reinforcement.

The same principle may be followed where it is desired to reinforce any portion or area of the body of the fiber sheet not adjacent to the edge thereof. The use of superposed strips compressed into the body of the sheet may be adapted to the formation of such a strengthened area in the body of the sheet not necessarily adjacent to an edge.

A blank may also be reinforced along a desired area not necessarily adjacent to the edge thereof by impregnation with a rigidifying solution in the manner hereinbefore set forth in such a way that only the area desired to be reinforced will be thus impregnated.

It will be obvious that, on these same principles a rigid sheet with a non-rigid edge may be produced, or a rigid sheet with non-rigid areas may be made. Thus, the body of the sheet may be impregnated with a rigidifying solution blocking out such solution from the area or edge which is not to be rigidified. Or the body of the sheet may be strengthened in accordance with the other principles herein set forth leaving a non-rigid edge or area.

Where the body of the sheet is to be reinforced by impregnation along a specific area or by the super-position of a strip of fiber board upon the sheet and subsequent treatment as hereinbefore described, it will again be possible for torsional strain to develop to produce an undesired bend line adjacent to the reinforcement. In such case, making the edges of boundaries of the reinforcing areas discontinuous or zigzagged lines will diffuse the torsional strain as above described.

However, this method of reinforcement may be used to create a bend line without weakening the sheet along such line, but rather by strengthening it adjacent to such desired bend line. Thus, reinforcing the sheet by impregnation or superposing of another strip along a desired bend line, having a straight line boundary along the side of the reinforced area adjacent to the desired bend line and making the other boundary or boundaries of the reinforcing area discontinuous lines as above described, will produce great concentration of torsional force at the straight line boundary of the reinforcing area and create a predetermined bend line in the body of the sheet immediately adjacent to and along such straight line boundary.

The usefulness of the above described rigidifying or reinforcing methods for special areas and methods for creating unweakened predetermined bend lines will now be obvious to those skilled in the art. Thus, aside from their use in the casing previously described, they may be used separately for purposes of specially reinforcing relatively small areas where there may be much wear or strain, or of creating flexible fold lines in rigid sheets, or of strengthening edges of sheets, or of rigidifying entire sheets, or even for producing a rigid sheet with a flexible edge.

It should be understood that the discontinuous or non-linear line above described may take many forms. It may be zigzagged as shown in the figures, scalloped, angular or broken in any way. It may even consist of a mere triangularly shaped edge or a single arc; the purpose in all cases being to reduce the effectiveness of the concentration of bending forces along a single line.

Figures 25, 26:
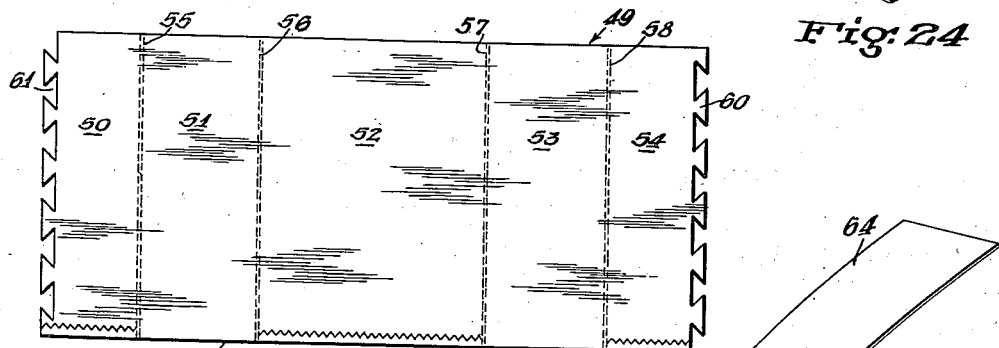
Figure 25 is a blank for a quadrilateral tubular casing.
Figure 26 is a detail of the edges of the blank of Figure 25 which are to be joined to form the casing.

In Figure 25, I have illustrated another embodiment of my invention in the form of a blank for a different type tubular casing or containers which may be folded to be set up. The blank 49 of said casing consists of walls 50, 51, 52, 53 and 54 separated by the bend lines 55, 56, 57 and 58 about which the walls may be turned or bent. It is intended that walls 50 and 54 be united along the non-linear lines 60 and 61, the function of which will be hereinafter described. In this application of my invention, the blank 49 may be rigidified as already described having the flexible bend lines 55, 56, 57 and 58, thus creating a rigid inflexible fire-resistant casing with flexible unweakened bend lines. The front edges 62 of the blank may also be reinforced in the manner hereinbefore set forth, the reinforcement being covered with a paper facing to present a smooth appearance.

The principle of dispersion of torsional strain along any straight line by a discontinuous or non-linear boundary is applicable here also in the case where edges 60 and 61 of the blank are to be joined. Such a non-linear line of union will produce far more substantial strength resisting sagging or buckling than an ordinary straight line union.

Figure 27:
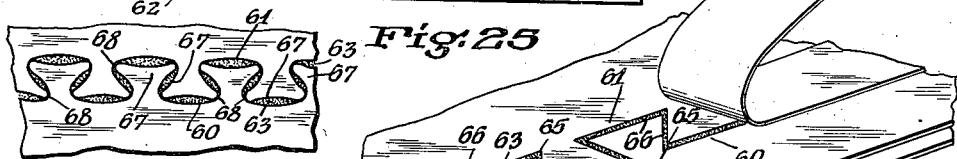
Figure 27 is a modified form of the edges shown in Figure 26.

In the enlarged Figure 26, it is seen that edges 60 and 61 are placed so that they are contiguous to each other. Adhesive may be applied at the exposed cut surfaces of the sheet 63 which may then be made to adhere together. Such edges may even be rigidified for added strength; and a tape 64 may be adhesively applied over the line of union for appearance or as a substitute for other adhesive means. It is seen that the edges 60 and 61 have positioning elements 65 and adhesive areas 66. This is emphasized in the construction shown in Figure 27 where the lines of union are so cut as to provide a hollow space for the introduction of adhesive at 67, 67 while the edges of the sheets are contiguous at 68, 68 to position the sheets properly. A tape may be adhesively applied beneath the sheets to be thus united at the line of union so that the adhesive may be retained in the hollows of 67, 67 until it has dried.

Figure 28:
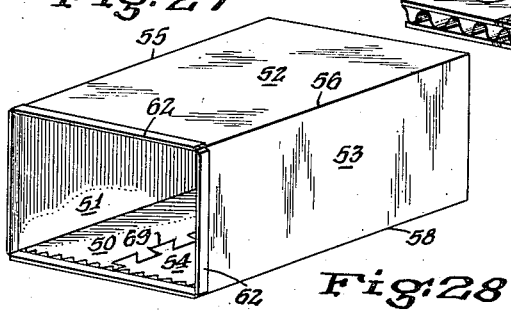
Figure 28 is a perspective view of a casing formed from the blank of Figure 25.

In Figure 28, I have illustrated the blank of Figure 25 as set up as an erected casing with rigid walls, flexible unweakened bend lines 55, 56, 57, 58, reinforced front edges 62 and my improved line of union 69.

In Figure 33, I have illustrated a modified means by which a secure union may be obtained between edges of adjacent sheets or opposed edges of a single sheet. In the figure, sheets 300 and 300' are to be united at the edges 302 and 303. Each edge carries a series of tongues 304 extending from such edge, which tongues may be integral with the sheet to be joined. Lugs 305 extend from the lateral edges of the tongues 304 and may be integral with such tongues. Preferably, the spaces between tongues will be equal to the width of said tongues, such space being, however, wholly or partly filled up by the lugs 305, adjacent lugs being separated, by a cut, slot or span as expediency requires.

In order to unite the sheets 300 and 300' by means of the tongues and lugs, such sheets should be placed with respect to each other so that each tongue 304 on each sheet will lie exactly opposite the space between tongues on the other sheet and thus lie opposite a pair of lugs 305. The edges 303 and 302 of the sheets 300 and 300' are then brought up in face to face relation to each other as shown in Figure 34, the tongues 304 are pushed beyond the lugs 305 on the opposed sheet so that each pair of lugs which originally were opposite a particular tongue of the opposed sheet engage behind said tongue and interlock with similar lugs extending from said tongue producing the condition shown in the plan view of Figure 35 in which it is seen that lugs 305' are caught behind tongues 304 and lugs 305 are caught behind tongues 304', the said lugs 305' and 305 interlocking with each other. In cross-section, the sheets thus joined will then present the appearance of Figure 36, edge 303 of sheet 300' overlapping and lying upon sheet 300, and the edge 302 of sheet 300 overlapping and lying upon sheet 300'.

Where the sheets to be thus united are of relatively stiff material, I have found it useful to provide score lines 306 between the tongues 304 and the remainder of the sheet and also to provide additional score lines 307 between the lugs 305 and their respective tongues 304 in order to facilitate the operation by which lugs of opposed sheets are interlocked with each other and behind opposed tongues.

In using my novel uniting means, it is not essential to bring the edges of the sheet up in face to face relation as in Figure 34. The sheets may be laid so that the edges overlap as shown in Figure 37; the tongues 304 may then be pressed beyond the lugs 305 of the opposed sheet so that the lugs of opposed sheets are caught behind tongues and interlock with each other, producing a line of union which in cross-section presents the appearance of Figure 38, which, it will be noted, is exactly similar to the line of union of Figure 36 which was formed by turning up the edges of the sheets in face to face relation with each other (Fig. 34) before interlocking the lugs and tongues.

Various other methods of making use of the special formations herein shown will be obvious. Thus, the edges may be bent along the score lines 306 and turned up at approximately right angles so that edges of opposite sheets may be placed in face to face relation with each other and the lugs and tongues interlocked; the sheets thereafter being laid flat with the overlapping edges pressed down as shown in Figure 36. Or the sheets to be united may be laid upon each other so that the preformed edges coincide, the lugs and tongues may be pressed into interlocking relationship, and the sheets laid flat, again producing the cross-sectional appearance of Figure 36. Or the tongues and their associated lugs may have the formation shown in Figure 39, the tongue 314 being pointed, the lugs 315 nevertheless being capable of interlocking and being caught behind the tongues; in which case, the points of each tongue may be inserted in the cut 316 behind a pair of lugs and the sheets then pushed together to produce the united sheets of Figure 40. It should be noted that such pointed formation will also facilitate the joining of sheets by any of the other operations above described.

Figure 41:
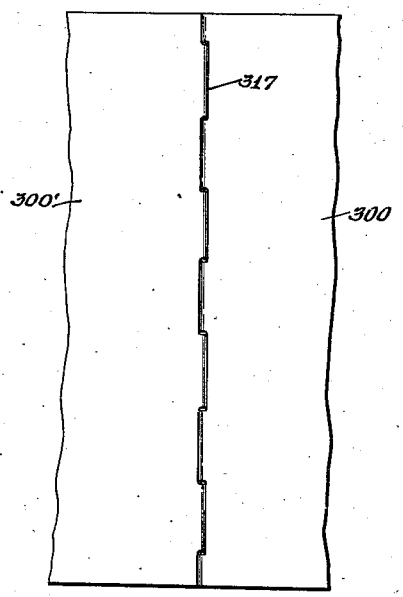
Figure 41 is a plan view of the reverse side of Figures 35 and 40.

Although I have illustrated rectangular and pointed tongues and lugs, it is obvious that many other forms may be used within the spirit of my invention. Thus, the tongues and lugs may be serrated in form or curved, their relative dimensions may be varied and their shapes otherwise changed without departing from the novel means described In all cases, the tongues and lugs may, in the united sheets, be caused to appear on one side of such sheet only as seen in the plan view of Figures 35 and 40. The opposite surface of such united sheet may then be plane and unmarred as in Figure 41 showing along line 317 only the barest suggestion of the fact that the sheet had been joined along such line.

Such a joint, by the interlocking of lugs and tongues, will create a secure mechanical seal not dependent on tape, adhesive, mortising or other means now known in the art.

In addition, after the joint is formed, the overlapping and interlocking lugs and tongues may be adhesively attached to the subjacent sheet to prevent any intentional disruption of the joint. Where the sheets are compressible, as for instance corrugated board, the overlapping tongues and lugs may be compressed together with the subjacent portions of the united sheets so that the entire sheet may be of uniform thickness, and adhesive tape may be placed over the joint for the purpose of improving the appearance.

The utility of this method of effecting a union between two sheets will now be obvious. Thus, it may be used to join together edges of a single sheet where it is necessary to do so to form a container such as that shown in my co-pending applications, Serial No. 690,360, filed September 2, 1933 and Serial No. 693,841, filed October 16, 1933. It may be used effectively to create a corner joint between two sheets, as for instance between the walls of a container which meet at a corner; the tongues and lugs then preferably lying on the interior of the angle thus formed.

This form of joint can be of exceptional usefulness in connection with "safety" envelopes and in the formation of "pilfer-proof" closures therefor. The edge of the flap of such an envelope and the free edge of the body of said envelope having the formation shown in Figures 33 or 39; the tongues and lugs being interlocked in the manner described in connection with Figure 37 so that the interlocking lugs and tongues will lie on the interior of the envelope, thus presenting at such line of union an outer surface similar to that shown in Figure 41. Such envelope then cannot be opened without tearing the lugs or tongues and thus revealing the fact that the envelope had been tampered with.

Where a serrated edge is used in the formation of this joint or where the tongues and lugs are used as previously described then after the sheets are united along the preformed edges a nonlinear or broken or serrated lines will be formed parallel to the line of union which will serve to disperse or diffuse any torsional forces which may otherwise tend to concentrate about the line at which such sheets are united to create an undesired predetermined parallel line thereat. Many uses of this form of joint will now be obvious.

Where, as in Figures 4–10 inclusive, sheets are to be laid upon each other to form a laminated sheet, various materials may be used for different laminations and the laminar sheet need not necessarily consist through its entire thickness, of the same type of material. Thus, one layer may be paper board, the next asbestos, the next paper, coated with "Prit" or any other substance which may resist and improve with heat.

In such cases, materials for forming one or more of the layers may not be readily procurable in proper or matching widths for the particular size of laminar sheet desired and in fact may be smaller or narrower than required for such sheet.

When it is required to lay together two sheets for the purpose of forming a single lamination, the problem of exactly matching such sheets arises. In cutting fibrous sheets various irregularities in the edges cannot be avoided, so that abutting edges of two sheets may not meet properly to create the desired single lamination. Such irregular meeting line, or any gaps which may be formed at such meeting line, may present an unlooked for and undesired weakness in the laminar sheet as a whole; and may even create an undesired bending line.

In Figure 29 I have illustrated a method by which close abutment of adjacent edges of two or more adjacent webs of material traveling from several rolls into laminar combination with superjacent and/or subjacent web, of sheet material, may be effected. By such method, the edges of abutting sheets may be exactly matched, any irregularity in the edge of one sheet being duplicated in the edge of the abutting sheet, so that the sheets when lain together to form a single continuous layer will match exactly.

The roll 80 of fibrous sheet material is mounted in a suitable support 81 in such manner that said roll may rotate freely about its axis 82 and thus permit the fibrous sheet material 83 to be unrolled and threaded past the cutting knife 84. In a similar manner, another roll 80' of fibrous sheet material is mounted, in a similar support 81' so that it rotates freely about its axis 82' and so that the sheet 83' may likewise be unrolled and threaded past the knife 84. The edge 85 of the sheet 83 is so arranged with respect to the edge 86 of the sheet 83' that they overlap each other to a slight extent, the edge 85 overlapping the edge 86 in Figure 29 and extending over a narrow portion of the sheet 83'. The two rolls 80 and 80' and their respective sheets 83 and 83' are unwound and caused to travel at the same speed in the direction indicated by the arrow 87, by any suitable means.

As shown in Figure 29 and more particularly in the cross-sectional view of Figure 30, the knife blade 84 is so mounted with respect to the sheets 83 and 83' that it cuts between the lines 85 and 86, thus cutting the overlapped portions of the sheets 83 and 83'. By this method a new edge 88 is formed for sheet 83 and a new edge 89 is formed for sheet 83'; and since such edges were formed by the same knife 84 during the same step of the same cutting operation, the edges 88 and 89 will be exactly matched. Any irregularity appearing on one edge matching exactly any irregularity appearing on the other. Thus, when the sheets 83 and 83' now continue to travel past the knife 84 and to the web of a subjacent or superjacent lamination, the new edges 88 and 89 of such sheets will match exactly.

It will of course be understood that the overlapping areas of the sheets 83 and 83' during this process need merely be of sufficient width to permit the knife 84 to cut through such overlapped areas to form the new edges 88 and 89. Such overlapped areas may however be varied in accordance with the desired width of the combined web or lamination to be formed from the sheets 83 and 83'. It is obvious that the portions 90 and 91 of the sheets 83 and 83' which are thus cut away may and should be removed in any suitable manner to permit the sheets 83 and 83' to lie in the same plane after the cutting operation.

The cutting knife 84 may be rotated in synchronization with the movement of the sheets 83 and 83' in any suitable manner. I have illustrated a preferred form in Figures 29 and 30 in which the cutting knife 84 is rotatably mounted on the idler shaft 92, the edge of the knife pressing against the rotating bearing 93 which is mounted in turn on the idler shaft 94. The pressure of the cutting edge of the knife 84 against the rotating bearing 93 and the movement of the sheets of material 83 and 83' between the knife 84 and the bearing 93, frictionally causing a rotation of the knife and bearing in synchronization with the movement of the sheets, effects the cutting operation hereinbefore described. Where it is desired to create non-linear or serrated abutting edges for the two sheets 83 and 83', the said edges nevertheless abutting and matching exactly, the cutting edge of the knife 83 may be varied as shown in Figures 31 and 32 so that the said cutting edge will produce the exact formation of the abutting edges desired. Likewise, by the use of two parallel cutting knives or by separating sheets after they are cut, a gap may be created in a lamination, said gap having exactly matched edges, whereby a clean, even bend line may be formed.

Figure 42:
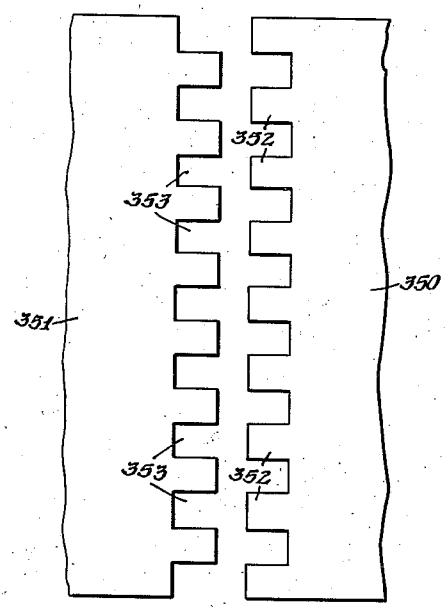
Figure 42 illustrates in plan view a modified form of the edge formation of Figure 33 for the purpose of uniting sheets at their edges.
Figure 43:
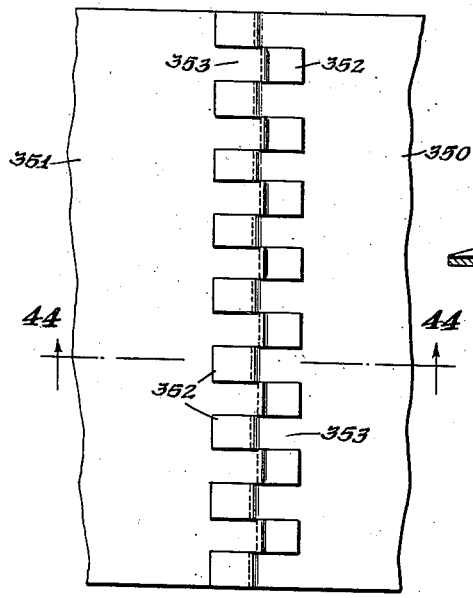
Figure 43 is a plan view showing the sheets of Figure 42 united along their edges.
Figure 44:
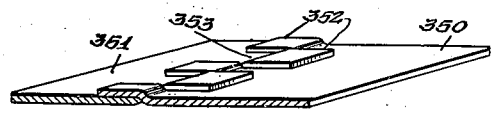
Figure 44 is a sectional view in perspective taken along the line 44—44 of Figure 43 and looking in the direction of the arrows.

In Figures 42, 43 and 44, I have shown a modification of the construction of Figures 33 to 41 inclusive, in which the sheets 350, 351 (Fig. 42) to be joined, have a mortised, indented, serrated or broken edge producing tongues or extensions 352 separated by spaces 353. As will be seen more clearly from Figures 43 and 44, sheets 350 and 351 may be laid together edge to edge so that tongues or extensions 352 of each sheet enter the spaces 353 between the tongues of the opposite sheet, the edges of the two sheets being interlocked by the interlocking of the tongues 352, to produce a firm, strong line of union. The interlocked tongues 352 may then be glued down upon the sheets on which they rest, they may be wholly or partially compressed into the body of the sheet upon which they rest to produce a level surface, and/or a strip of tape may be adhesively affixed over the line of union formed by the tongues 352, wholly or partially covering the tongues and maintaining the predetermined desired relation between them.

Having now described my invention, I claim:

1. A sheet of fibrous material having an edge reinforcement integral with the body of said sheet, said edge reinforcement comprising a plurality of layers of fibrous material adhesively bound to said sheet at said edge, said additional layers comprising a plurality of folds of the free edge of said sheet along fold lines; a series of lugs cut from one of said layers along the outermost of such fold lines lying along the boundary between the edge reinforcement and the remainder of the sheet, the said fold line being discontinuous along the bases of said lugs; said lugs projecting from said reinforcement and lying against the body of the sheet; the edges of said lugs and said outermost fold line forming a broken non-linear boundary between said edge reinforcement and the remainder of the sheet and thereby preventing the concentration of torsional forces between such reinforced edge and the remainder of the sheet along a straight line.

2. A stiff sheet of fibrous board having a marginal reinforcement integral with the body of said sheet, said marginal reinforcement comprising a superposed layer of similar material adhesively bound to said sheet at said margin; the edge of said sheet and an edge of said superposed layer being coterminous; the edge of said superposed layer opposite said coterminous edge being irregular along a non-linear line forming the boundary between the reinforced margin and the remainder of the sheet and preventing the concentration of torsional forces between the reinforced margin and the remainder of the sheet along a straight line.

3. A stiff sheet of fibrous board having a marginal reinforcement integral with the body of said sheet, said marginal reinforcement comprising a superposed layer of similar material adhesively bound to said sheet at said margin; the edge of said sheet and an edge of said superposed layer being coterminous; said additional superposed layer being an integral fold back from the edge of said sheet; the edge of said superposed layer opposite said coterminous edge being irregular along a non-linear line forming the boundary between the reinforced margin and the remainder of the sheet and preventing the concentration of torsional forces between the reinforced margin and the remainder of the sheet along a straight line.

4. A stiff sheet of fibrous board having a marginal reinforcement integral with the body of said sheet, said marginal reinforcement comprising a plurality of superposed layers of similar material adhesively bound to said sheet at said margin; the edge of said sheet and an edge of said superposed layer being coterminous; said additional superposed layers comprising a plurality of folds of the edge of said sheet and projections integrally extended from at least one of said layers along the edge opposite said coterminous edge; the edge of said superposed layer opposite said coterminous edge being irregular along a nonlinear line forming the boundary between the reinforced margin and the remainder of the sheet and preventing the concentration of torsional forces between the reinforced margin and the remainder of the sheet along a straight line.

PHILIP ZALKIND.